June 18, 1957     K. M. HOLMAN ET AL     2,796,508
METHOD FOR PRODUCING NON-FERROUS CONTINUOUS WELD TUBING
Filed July 25, 1952     2 Sheets-Sheet 1

Keith M. Holman
Fermore B. Cooper
Frank E. Bergman
INVENTORS

BY *Glenn L. Fish*
ATTORNEY

June 18, 1957   K. M. HOLMAN ET AL   2,796,508
METHOD FOR PRODUCING NON-FERROUS CONTINUOUS WELD TUBING
Filed July 25, 1952   2 Sheets-Sheet 2
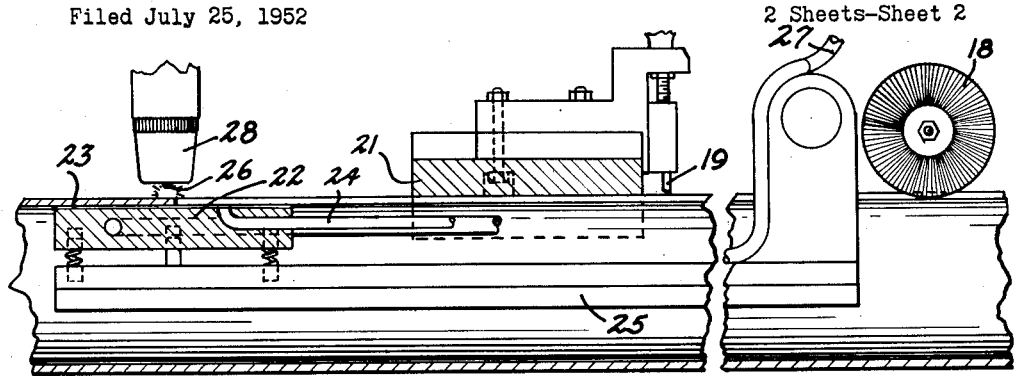
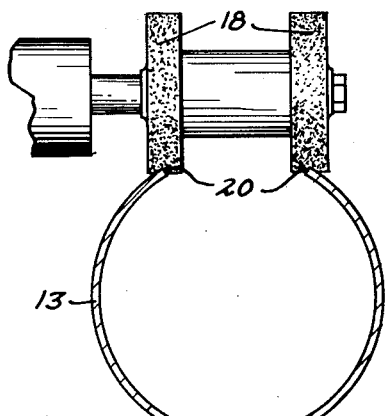
FIG-4
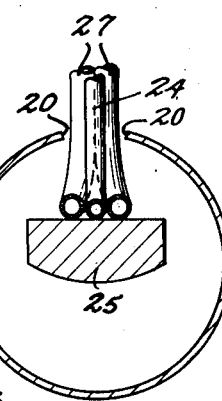
FIG-5
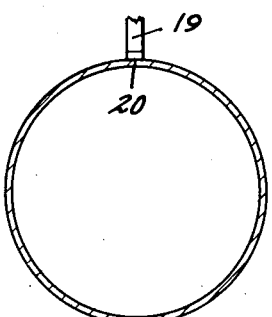
FIG-6
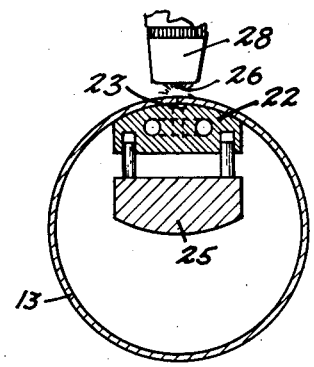
FIG-7
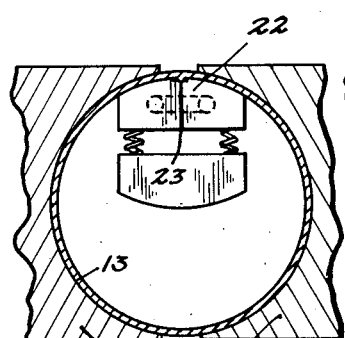
FIG-8
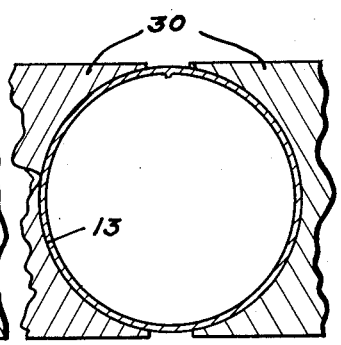
FIG-9
Keith M. Holman
Fermore B. Cooper
Frank E. Bergman
INVENTORS
ATTORNEY

United States Patent Office 2,796,508
Patented June 18, 1957

2,796,508

METHOD FOR PRODUCING NON-FERROUS CONTINUOUS WELD TUBING

Keith M. Holman, Fermore B. Cooper, and Frank E. Bergman, Spokane, Wash., assignors to Aluminum Supply Co., Spokane, Wash., a partnership Application July 25, 1952, Serial No. 300,874

1 Claim. (Cl. 219—61)

This invention is the method and apparatus for producing non-ferrous continuous weld tubing.

One object of the invention lies in the production of tube of accurate size and wall thickness, and of high physical properties.

In the known methods of producing non-ferrous tubing, it is usual to form a strip of aluminum into a tubular shape with the edges of the strip lying flat against one another, and then make a seam weld of the edges, using resistance welding, the welding current passing from one welding electrode to the other through two thicknesses of the strip and, of course, the adjoining faces.

Simple cylindrical sections of aluminum can be pressure welded. The parts to be welded are clamped in dies and pressure is applied before the application of heat, and subsequently the cold pressure weld is fused by the application of heat, for example, by electric arc welding.

These methods have proven to produce an inferior union or bonding of the metal or a variation in wall thickness. Also, as in the case of the lap joint, the outside wall is not smooth and therefore objectionable.

According to the present invention, a method of forming tubing by welding together two surfaces of non-ferrous metal such as aluminum, aluminum alloy, copper or the like, comprises the steps of, first eliminating all oxides and foreign elements from adjoining surfaces to be welded; second welding the surfaces, for example, by electric arc welding in an inert gas shield, such as argon; and third applying transverse pressure to the weld during its transformation from a solid-to a molten-to a solid state.

No flux is necessary during the welding step and actually it is undesirable. The edges of the tubular strip are welded in butting relation thus forming smooth internal faces and eliminating waste of material as in other types of joints.

In applying the invention, we have provided a machine adapted to shape strip material into a tube and control it during the welding steps. The invention is illustrated, in so far as possible, in the accompanying drawings, in which like numerals are employed to designate like parts.

Figure 3 is a longitudinal cross section taken through a portion of the machine and showing the welding step of the process.

Figures 4, 5, 6, 7, 8 and 9 are transverse cross sections of the tubing in sequential arrangement of the various forming operations.

Figure 1:
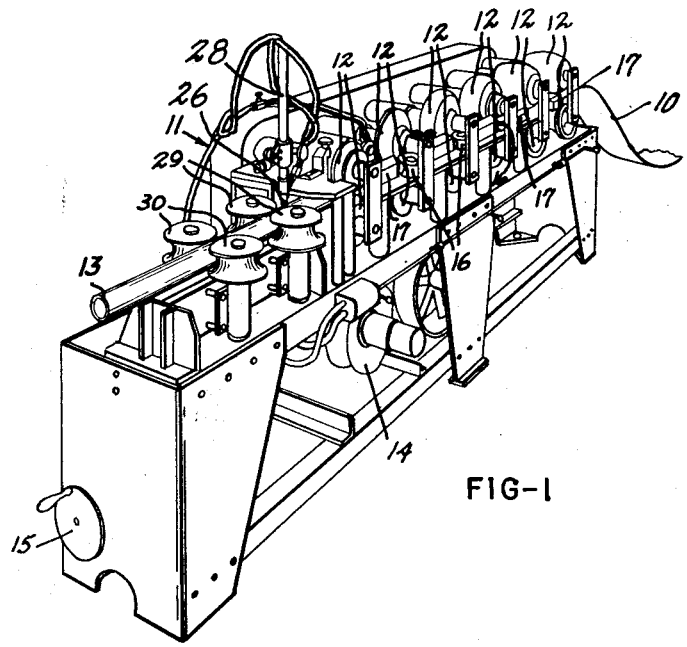
Figure 1 is a perspective view of the machine which is physically capable of carrying out the steps of the present invention.

Referring now to the drawings, and more particularly to Figure 1, it will be seen that a flat strip 10 of non-ferrous metal is fed into a machine, indicated in general by the numeral 11, which has successive cooperating pairs of upper and lower powered rollers 12 each properly shaped and cooperating with the others to form a continuous tube 13 of the flat strip 10.

Any suitable rotary power source may be used to drive the pairs of rollers 12. A variable speed drive mechanism 14 is interposed between the rollers and power source and an accessible crank 15 is adapted to selectively adjust the speed ratio of the rollers to the power source. Gears or chain and sprockets or other definite mechanical drive may be employed to drive the shafts upon which the rollers 12 are mounted.

Other means, such as rollers 16 and shoes 17, assist in shaping the tube as it is drown along by powered rollers 12. It is obvious that other means of shaping the tube could be employed and it is not our intention to limit ourselves unnecessarily to any specific means of forming the strip into a tubular shape other than that particularly required by the appended claims.

Preparation of the surface of the strip to be welded is important in producing a good weld on thin material. The oxide coating on the aluminum is found to interfere and prevent coalesence of the weld metal. Therefore it is necessary that it be removed. This may be accomplished mechanically with a wire wheel, or the like, or with a chemical etch. We have shown spaced wire wheels 18, one for each edge, which, as seen in Figure 4, clean the outer marginal edge portion of the tube 13 as well as the abutting edges. A similar pair of wire wheels (not shown) may be employed to clean the inner marginal edge portions of the strip 10 before it is formed tubular. If desired, one may employ an adjustable scarfing knife 19 to clean the edge faces by removing a minute portion thereof.

An important part of performing an acceptable weld job lies in accurately butting and holding the edge faces 20 relative to each other during the welding step. This may be accomplished in a number of ways. We have found that by providing multiple shoes 21 disposed radially about the tube we can properly control the meeting of the edges 20. The shoes 21 may be adjustably mounted within a ring encircling the tube if desired. Each shoe may have a pair of threaded screw rods threadedly engaged through the ring body for setting and adjusting the shoes. However, once the shoes are adjusted, no further change should be necessary. Therefore, for all practical purposes the shoes 21 may also be considered stationary.

Inspection of Figures 3, 7 and 8 will reveal that we have provided an internal spring held head 22 which has a longitudinally extending groove 23 disposed beneath the adjoining edges 20. The head is provided to apply an inert gas, such as selium or argon, received through conduit 24, to the under side of the welded metal, thus displacing any oxygen or other active gas which may be present and inclined to interfere with the welding process.

The head 22 is supported by an arm 25 supported outside of the tube 13 on the machine and extends longitudinally through the tube to a point directly under the welding electrode 26. Tubes 27 supply a circulating coolant through the head to prevent overheating and hasten the freezing or setting of the weld metal.

A shield 28 is provided about the electrode 26 and the inert gas is supplied within this shield to displace active elements from about the arc. The gas may be supplied from any source such as a storage tank.

Electrode 26 is supplied with currents up to 350 amperes depending on the condition and requirements. There are advantages of using an alternating current with superimposed high frequency current over the direct current, but we are not concerned with the particular welding medium beyond its bare requirements for fusion welding aluminum.

The machine is connected to one pole of the current supply and conducts this current to the tube 13. Since electrode 26 is the other pole, and the current properties being correct, an arc is produced between the tube 13 and the electrode 26 at the adjoining edges 20 and the heat thereof melts the metal in the immediate area.

Figure 2:
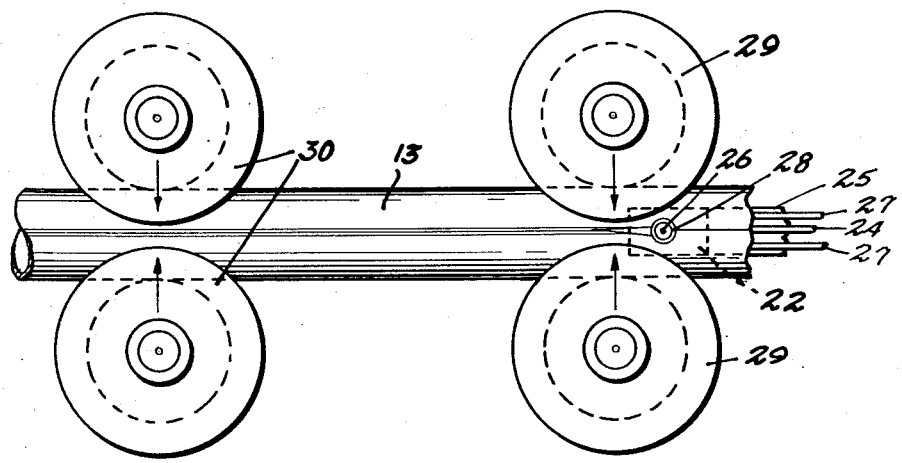
Figure 2 is a fragmentary plan view of the transverse pressure applying rollers.

Spaced pressure rollers 29 produce a transverse pressure or hot upset upon the welding seam and this pressure is continued during the transformation period of the metal from solid to molten and again to solid. Inspection of Figure 2 will reveal that the electrode 26 is disposed in advance of the hot upset rollers 29 and the transverse pressure is applied primarily after the heat is applied. Of course the transverse pressure is applied somewhat at the point of heat application, as well as in advance of its application, but not sufficiently to be confused with pressure welding.

It has been found that this welding and upset portion of the process rearranges the grain of the metal from its original longitudinal direction to a transverse direction and produces a strong weld equal in strength to the parent metal. It is also found that if the transverse pressure is not adequate, an insufficient amount of metal is present at the weld during the molten state and it fails to support itself properly.

It is to be noted that we do not provide a lip or any extra metal at the weld and therefore have no waste of material nor a large bulky weld to interfere with the surface of the tubing.

Rollers 29 and 30 are adjustable toward and away from each other to properly adjust the upset pressures to produce a perfect weld.

Obviously other sets of rolls or straightening elements may be added to finish the tube to a perfect cylinder.

Having thus described our invention, we claim:

The method of producing continuous weld aluminum tubing comprising the steps of removing the oxide from the marginal edge portions and edges to be welded of an aluminum strip, forming the strip into a continuous tube with said edges abutting, applying heat to the abutting edges by means of an inert gas shielded arc to melt the edges and cause them to coalesce, and simultaneously applying inert gas to the under side of the weld area, supporting the molten coalesced edges from within the tube, subjecting the weld to a transverse upset during the period of time when the metal is heated to a molten state and is returning to the solid state, and subjecting the weld to a transverse cold upset to eliminate minute transverse cracks.

References Cited in the file of this patent

UNITED STATES PATENTS

| | | |
|---|---|---|
| Re. 14,927 | Sessions | July 27, 1920 |
| 611,222 | Ries | Sept. 20, 1898 |
| 1,810,112 | Rimenschneider | June 16, 1931 |
| 1,920,900 | Sykes | Aug. 1, 1933 |
| 2,061,671 | Rimenschneider | Nov. 24, 1936 |
| 2,254,972 | Brown | Sept. 2, 1941 |
| 2,444,778 | Kopec | July 6, 1948 |